Patented Oct. 21, 1941

2,259,761

UNITED STATES PATENT OFFICE 2,259,761

JOINTING COMPOSITION

Ralph H. Manley, Arlington Heights, Ill., assignor to Clay Products Association, Chicago, Ill., a corporation of Illinois No Drawing. Application April 28, 1939, Serial No. 270,663

1 Claim. (Cl. 260—36)

This invention relates to a jointing composition. More particularly it pertains to a fusible resinous composition especially adapted to use in the jointing of clay sewer pipes, cement concrete sewer pipe, cast iron pipe, and the like.

A satisfactory jointing composition for use in connection with vitrified clay sewer pipes must exhibit suitable mechanical strength, waterproofness, chemical inertness and ability to resist the various corrosive agents to which it will be exposed. It should also be toxic toward roots, to prevent the clogging of pipe and bursting of joints by roots growing therein.

Further, in the jointing of the vitreous surfaces of burnt clay sewer pipes with a fused resinous composition, the latter must not only wet said surfaces completely, if necessary displacing a film of water adhering thereto, but must also, when solidified, adhere strongly to such vitreous surfaces. To these properties, there must be added a suitable consistency and plasticity when fused, to permit application to bell and spigot joints in the conventional manner by means of a pouring collar or rope.

I am aware of no prior art fusible resinous composition meeting all these requirements, which is not surprising in view of the number and variety of the latter.

It is therefore an important object of the present invention to provide a fusible resinous composition for the jointing of vitrified clay sewer pipes which shall be satisfactory in the respects indicated.

Other and further important objects of the present invention will become apparent to those skilled in the art from the following description and appended claim.

I have found that vitrified clay sewer pipes may be satisfactorily jointed by means of a composition comprising a synthetic resin of the coumarone-indene type, a mineral filler, a plasticizer, and an agent toxic to roots. Such a composition may be fused and applied in the conventional manner between the surfaces to be joined where it will harden to form a strong, water and rootproof joint highly resistant against the corrosive agents to which sewer pipe is exposed.

I have found a properly graded silica aggregate particularly suitable for use as a filler, although other materials, for instance ground feldspar or burned clay, may also be used. Among the substances capable of functioning as plasticizers, dibutyl phthalate, tricresyl and triphenyl phosphates may be mentioned. Copper soaps, arsenic compounds such as arsenates and arsenites and the oxides of arsenic, mercury compounds such as mercuric oxide and carbonate, and organic phenolic compounds such as phenol and the cresols, and equivalent substances may be employed to render the jointing composition toxic to roots.

The application of the above disclosed principles is illustrated by the following example:

1 part by weight of a coumarone-indene resin (melting point preferably about 100°–125° F.) 2½ parts of a graded silica aggregate (15 percent by weight 80 to 100 mesh, 15 percent 100 to 150 mesh, 15 percent 150 to 200 mesh, and 55 percent 200 mesh or finer), 0.1 part dibutyl phthalate, and 0.036 part of cupric oleate are heated together to fuse the resin and worked thoroughly to produce a uniform mixture which is allowed to cool and solidify. The resulting compound is fused for application, which in the case of bell and spigot type vitrified clay sewer pipe is effected in the conventional manner, as follows: the spigot of one end of the pipe is placed in the bell of the next piece, and then calked with jute or oakum, or by other suitable means, to center the spigot in the bell, and to prevent infiltration of the compound through the joint between the two pipes. If the pipe is to be jointed in a horizontal position, a runner is then placed around the pipe to close the opening at the bell excepting at the top where a six-inch tall funnel-shaped metal pouring gate is placed. The molten compound is then poured into the joint through the pouring gate, and the gate filled to the top. If the pipe is to be filled in a vertical position, the joint is made simply by filling the bell with the molten compound after being suitably centered and calked as above.

This composition is not readily damaged by overheating. It is further characterized by mechanical strength and a high resistance against the action of acids or alkalies as well as against oxidation, besides being sufficiently toxic to roots to prevent their growing into joints. When fused, the composition possesses the proper consistency and plasticity for application in the conventional manner, and it may successfully be applied to pipes wetted with water and will adhere strongly thereto after solidification to form a tight, waterproof joint. Its cost is low enough to permit its practical use.

The present invention may be broadly defined as contemplating a jointing composition for use in connection with vitrified clay pipes comprising major proportions of a suitably graded inert, preferably siliceous, mineral filler and a plasticized resin of the coumarone-indene type together with a minor proportion of an agent toxic to roots. The root toxic agent may, however, be omitted if desired. A judicious choice and proportioning of the mineral filler and of the plasticized coumarone-indene resin, to which those skilled in the art will be guided by the herein disclosed principles and illustrative example in the light of their past experience, will make possible the production of a jointing composition which when fused exhibits a suitable plasticity and fluidity. To these mineral and resinous ingredients there is added an effective amount of an agent toxic to roots. Many variations in detail are thus possible without departing from the principles of this invention, and it is, therefore, not purposed to limit the patent granted hereon otherwise than necessitated by the scope of the appended claim.

I claim as follows:

A jointing composition for vitrified clay pipe, consisting essentially of a uniform mixture of a coumarone-indene resin, a plasticizer, a finely divided mineral aggregate, and an agent toxic to roots, the plasticizer being present in an amount equal to about one-tenth of the weight of the coumarone-indene resin and the aggregate being present in an amount equal to about two and one-half times the weight of said resin, said mixture fusing upon being heated to be readily pourable into a joint and resolidifying upon cooling to form an adherent seal for said joint that is sufficiently toxic toward roots to prevent their growth into said joint.

RALPH H. MANLEY.